United States Patent [19]

Jones

[11] Patent Number: 5,668,314

[45] Date of Patent: Sep. 16, 1997

[54] APPARATUS FOR TESTING VEHICLE AIR BRAKES

[76] Inventor: Robert Jones, 1913 Castle Dr., Garland, Tex. 75040

[21] Appl. No.: 684,924

[22] Filed: Jul. 19, 1996

[51] Int. Cl.⁶ .................................................. G01L 5/28
[52] U.S. Cl. ........................... 73/129; 73/39; 73/121
[58] Field of Search .................................. 73/39, 40, 121, 73/129, 756; 303/85, DIG. 1

[56] References Cited

U.S. PATENT DOCUMENTS

| | | | |
|---|---|---|---|
| 1,914,602 | 6/1933 | Hume . | |
| 2,177,520 | 10/1939 | Farmer | 73/51 |
| 2,316,217 | 4/1943 | Birch | 73/51 |
| 3,531,981 | 10/1970 | Pommer | 73/39 |
| 4,050,298 | 9/1977 | Hope et al. | 73/121 |
| 4,062,224 | 12/1977 | Zeleney | 73/39 |
| 4,361,362 | 11/1982 | Fauck | 303/22 |
| 4,440,015 | 4/1984 | Hann | 73/39 |
| 4,513,604 | 4/1985 | Frantz et al. | 73/39 |
| 4,658,869 | 4/1987 | Soon-Fu | 141/98 |
| 4,712,422 | 12/1987 | Munro | 73/129 |
| 4,847,770 | 7/1989 | Kane et al. | 364/426.05 |
| 5,113,694 | 5/1992 | Sich | 73/121 |
| 5,235,859 | 8/1993 | Wallis | 73/756 |
| 5,357,800 | 10/1994 | Reuter et al. | 73/121 |
| 5,406,837 | 4/1995 | Britt | 73/121 |
| 5,488,859 | 2/1996 | Britt | 73/129 |
| 5,602,482 | 2/1997 | Gutierrez | 73/129 |

*Primary Examiner*—Richard Chilcot
*Assistant Examiner*—Eric S. McCall
*Attorney, Agent, or Firm*—George R. McGuire

[57] ABSTRACT

A portable, hand held device for testing the air brakes of a tractor trailer type truck. The device is generally comprised of an elongated body having a cavity bored therein which extends perpendicularly to the longitudinal axis of the body, and an inlet and outlet attached to opposite ends thereof. A valve assembly consisting of a series of co-linearly mounted, axially displacable springs and plungers are operatively positioned within the bore, and effectively open or close the fluid communication between the inlet and outlet. A first hose extends between a compressed air tank and the inlet, and a second hose extends between the outlet and the glad hand of the truck. A lever is pivotally attached to the body for effecting operation of the valve assembly, and thus may be selectively moved to effect the flow of compressed air from the compressed air tank to the glad hand. A pressure regulator and gauge are also incorporated into the device for permitting accurate pressure tests to be conducted on the air brakes.

14 Claims, 3 Drawing Sheets

APPARATUS FOR TESTING VEHICLE AIR BRAKES

BACKGROUND OF THE INVENTION

The present invention generally relates to apparatus for testing and checking the air brakes of a tractor trailer, and more specifically to such testing apparatus which interconnects the truck's glad hand to a tank of compressed air.

The air brakes of a truck generally operate at a pressure under 50 PSI. Quite often the air brakes on a truck will fail or will require more pressure than usual to bring the truck to a stop. Various factors, such as cold weather or the type of terrain the truck drives on, contribute to the brake's malfunctioning.

When such a situation occurs, the truck driver will typically bring the truck into a shop and a mechanic will run a hose between a compressed air tank and the truck's brakes line. The mechanic then sends air under extraordinarily high pressure (100-160 PSI) through the hose, thereby causing the brakes to be slammed into braking position with any obstruction that may have caused the problem being displaced by the high pressure air. However, although this procedure may cause the brakes to operate under the extraordinary pressure, the problem may not be completely solved and the brakes may again fail under normal conditions.

In some situations, even the use of high pressure won't cause the brakes to function, and the problem must be diagnosed in an alternate manner. Typically, a diagnostic test will require two mechanics; one to hold the brake pedal down, and another to crawl beneath the truck to observe where the problem is occurring. One mechanic would then depress the brake pedal to permit the compressed air to flow through to the brakes, while the other mechanic observes the brakes and tries to diagnose the problem. Although this solution sometimes works, it does require the use of two mechanics, one of whom does nothing but step on and off the brake pedal, thereby adding labor costs to the repair.

It is therefore a principal object of the present invention to provide a device which permits one mechanic to accurately diagnose a pressure related problem occurring with a truck's air brakes.

It is an additional object of the present invention to provide an air brake diagnostic tool which is easily handled and portable.

It is another object of the present invention to provide an air brake diagnostic tool which is easily and inexpensively manufactured.

Other objects and advantages of the present invention will in part be obvious and in part appear hereinafter.

SUMMARY OF THE INVENTION

In accordance with the foregoing objects and advantages, the present invention provides a hand held device which permits a single mechanic to simulate realistic braking conditions while simultaneously observing the brake line. The device includes an inlet which receives a line extending from a compressed air tank, a lever for operating a spring biased, pressure release valve, and an outlet for receiving a line which extends to a truck's glad hand. In addition, the device may include a pressure regulator and a pressure gauge incorporated therein. The lever simulates the brake pedal of the truck; squeezing the lever simulating the depressing of the brake pedal, and the neutral lever being the same as an undepressed brake pedal.

The valve arrangement is disposed between the device's inlet and outlet, and includes a pair of spring biased plungers positioned in axially movable, co-linear relation with one another. The upper plunger is hollow, includes a series of holes formed therethrough, the holes being positioned adjacent its upper end which protrudes out of the device's body and is positioned in contacting relation with the lever. The lower plunger sits upon a spring and contains an annular flange formed at an intermediate position along its length. The flange seals off flow to the outlet when the lever is left free, and permits air to flow through the outlet when the lever is depressed. Depressing the lever forces the plungers down against the biasing of the springs, and opens the fluid passage for air to pass through the outlet.

A regulator positioned adjacent the device's inlet, and a pressure gauge positioned adjacent the device's outlet permit the pressure to be precisely known and controlled. This permits a mechanic to accurately determine how much pressure is needed to cause the brakes to properly function, and ensure that the amount of pressure deliverable from the brakes will be sufficient.

BRIEF DESCRIPTION OF THE DRAWINGS

The present invention will be more fully understood when read in conjunction with the following Detailed Description with reference to the drawings, in which.

DETAILED DESCRIPTION

Figure 1:
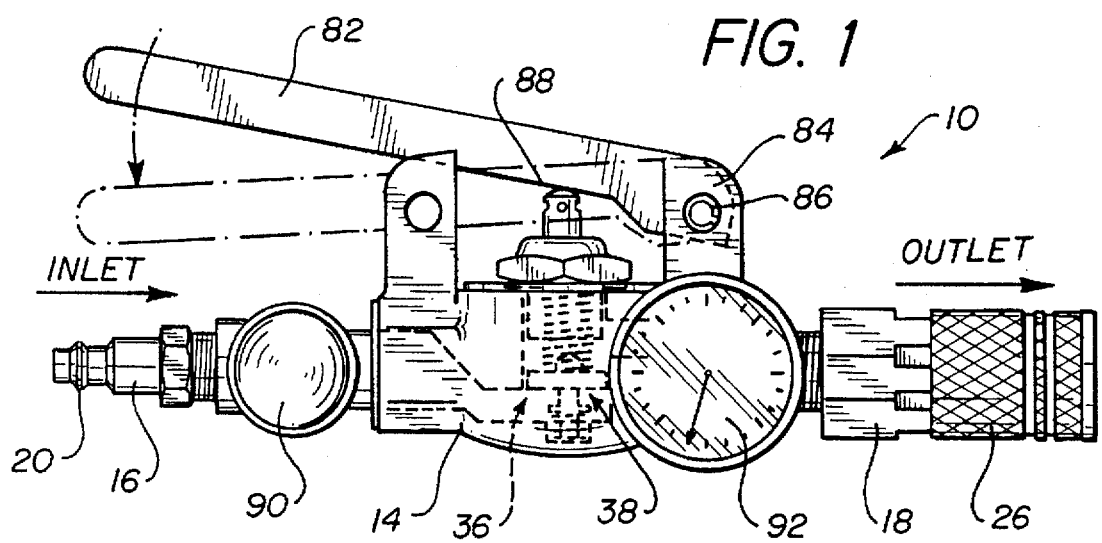
FIG. 1 is a front elevational view of the present invention.
Figure 2:
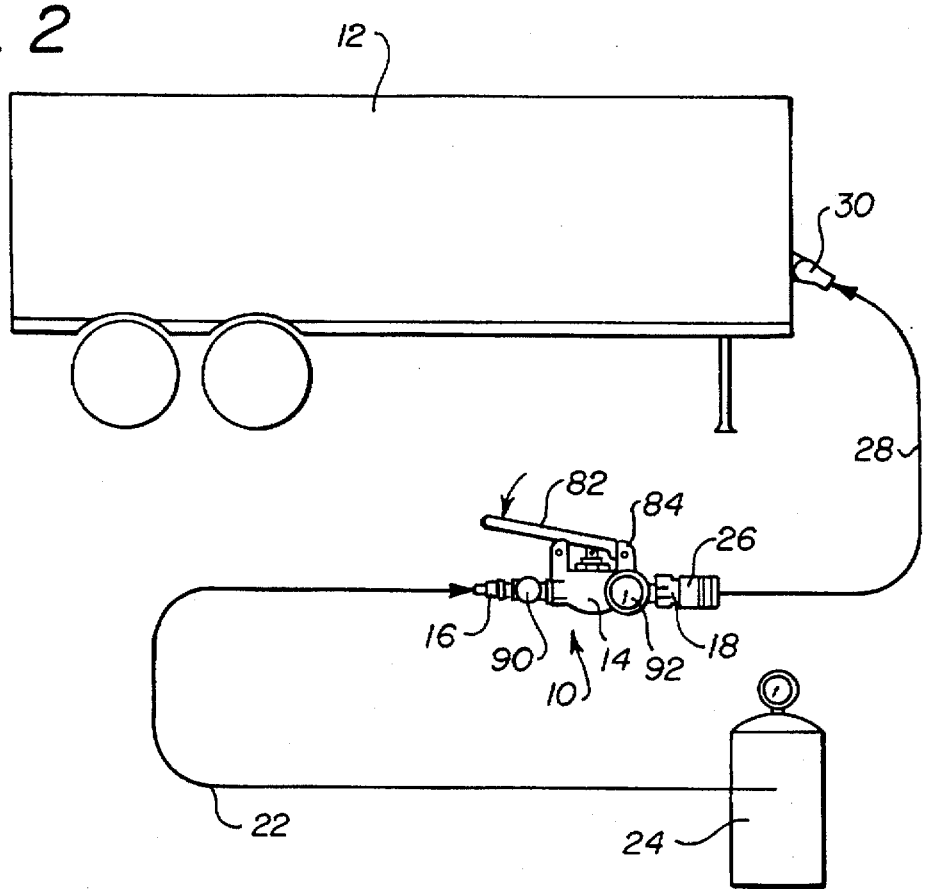
FIG. 2 is a schematic view of the present invention shown in combination with a compressed air tank and a tractor trailer.

Referring now to the drawings, wherein like reference numerals refer to like parts throughout, there is seen in FIG. 1 a portable, hand held, air brake testing device denoted generally by reference numeral 10. Device 10 is intended to effectively override and simulate the brake pedal of a conventional, tractor-trailer type truck 12, thereby permitting a single mechanic to simultaneously operate and observe the truck's brakes under various pressure conditions.

Device 10 is generally comprised of an elongated body 14 extending along a longitudinal axis L—L and having an elongated inlet 16 and outlet 18 integrally, longitudinally extending from opposite ends thereof. The distal end of inlet 16 includes at least one annular rib 20 formed thereon for securely retaining one end of a hose 22 thereon, with hose 22 extending therefrom to a compressed air tank 24. The distal end of outlet 18 includes a collet 26 for securely retaining a second hose 28 thereon, with hose 28 extending therefrom to the glad hand 30 of truck 12. Inlet 16 and outlet 18 are in fluid communication with one another, as will be explained in further detail hereinafter, thereby fluidly interconnecting compressed air tank 24 to glad hand 30.

Inlets 16 and outlet 18 each include a fluid passageway 32 and 34, respectively, extending therethrough in spaced, parallel relation to one another along longitudinal axes X—X and Y—Y, respectively. Axes X—X and Y—Y are also substantially parallel to axis L—L. Air flowing from tank 24, through hose 22 and into inlet 16 passes through passageway 32 and is deposited in a cavity 36 formed within body 14 for housing a valve assembly, denoted generally by reference numeral 38. Depending on the position of valve assembly 38 within cavity 36, the air that flowed through passageway 32 may or may not then flow through passageway 34, out outlet 18, through hose 28 and into glad hand 30. When the compressed air does flow into glad hand 30, it is then distributed through the brake lines of truck 12. Thus, cavity 36 is the interface between inlet 16 and outlet 18 which maintains the fluid communication therebetween.

Cavity 36 is essentially a bored hole formed through the top of body 14 that extends along a longitudinal axis Z—Z which lies essentially perpendicular to axes L—L, X—X and Y—Y. A shoulder 40 is annularly formed at an intermediate position along the length of cavity 36, thereby separating cavity 36 into distinct lower and upper regions 42 and 44, respectively, with lower region 42 having a smaller diameter than upper region 44. Passageways 32 and 34 flow into lower and upper regions 42 and 44, respectively. The open top of cavity 36 includes a series of internal threads 46 formed therein for cooperatively receiving a valve compression nut, denoted generally by reference numeral 48.

Figure 3:
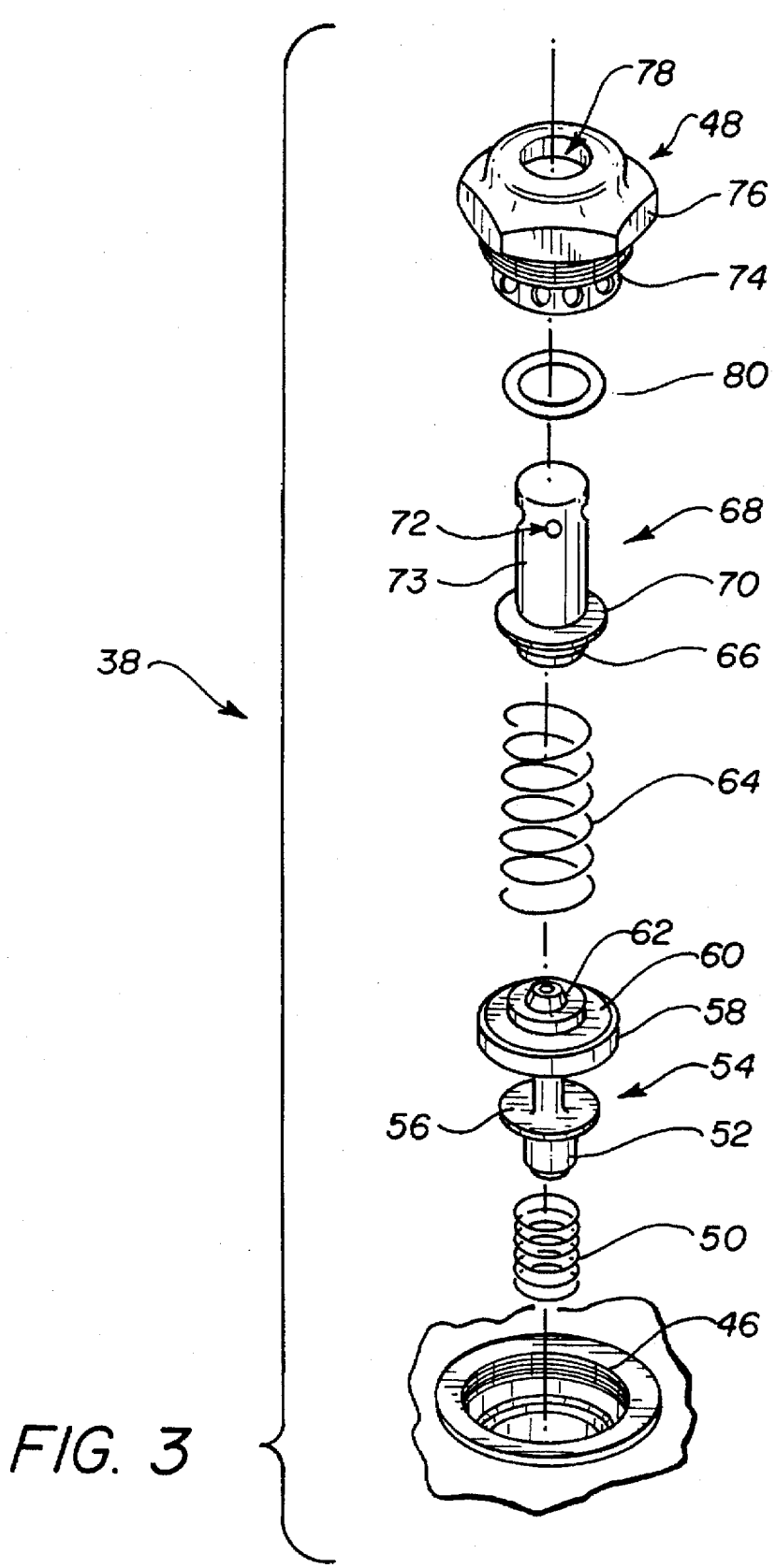
FIG. 3 is an exploded perspective of the valve assembly of the present invention.
Figure 4:
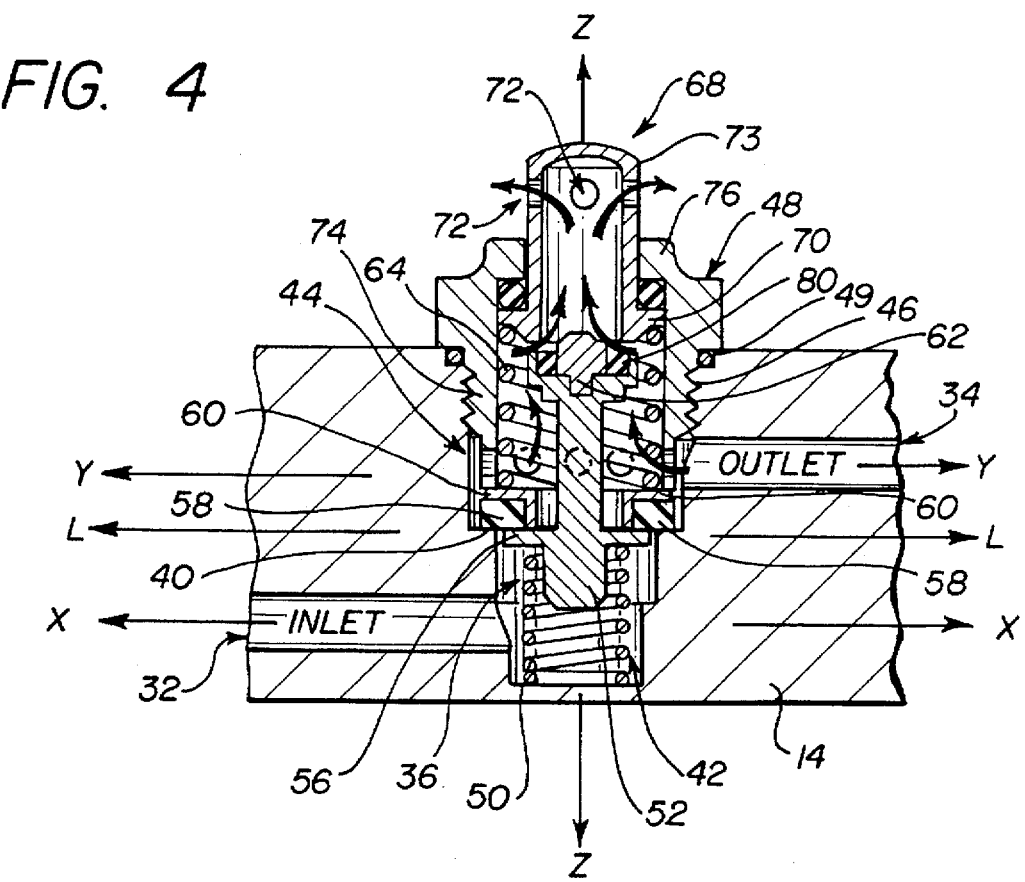
FIG. 4 is a cross-sectional view of the valve assembly in a closed state.
Figure 5:
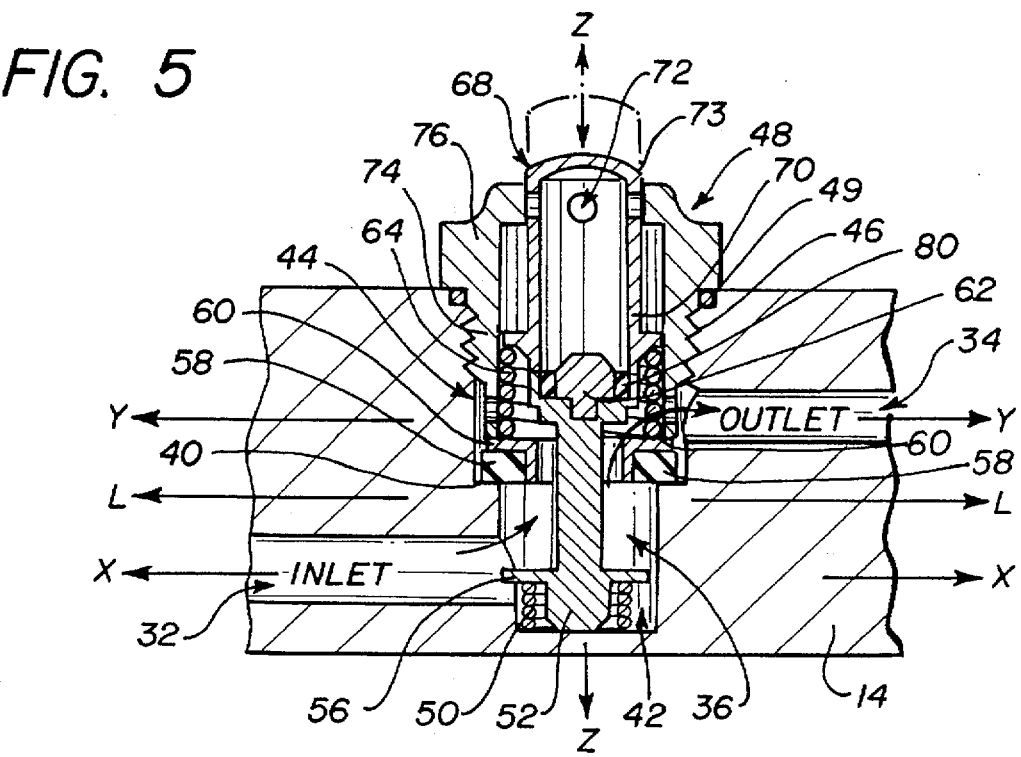
FIG. 5 is a cross-sectional view of the valve assembly in an open state.

Referring now to FIGS. 3–5, valve assembly 38 is seen to be compressively retained within cavity 36 by nut 48. A rubber O-ring 49 seals the interface between nut 48 and cavity 36 to minimize the amount of compressed air that may leak. Specifically, a first coil spring 50 is positioned on the floor of lower region 42, extending co-linearly along axis Z—Z. The tip 52 of a sealing plunger 54 is received within, and an annular flange 56 positioned at an intermediate position along plunger's 54 length is biased against the upper end of spring 50, thereby holding plunger 54 in biased, co-linear relation to spring 50 which will effect axial movement of plunger 54 in response to external forces. Collectively, a rubber gasket 58 which is placed in frictional engagement over the periphery of a bushing 60 are concentrically positioned on the shaft of plunger 54 and are loosely slidable along the longitudinal axis of plunger 54 between flange 56 and a plunger head 62 when valve assembly 38 is compressively retained within cavity 36. Gasket 58 and bushing 60, although slidable along the longitudinal axis of plunger 54, are positioned in stationary, abutting relation atop shoulder 40. Also, a space exists between the shaft of plunger 54 and bushing 60, thereby permitting air to pass therebetween. When valve assembly 38 is in its closed state (which will be described in further detail hereinafter) flange 56 is biased by spring 50 against the lower surfaces of gasket 58 and bushing 60; when in its open state, flange 56 is positioned in vertically spaced relation beneath gasket 58 and bushing 60.

A second coil spring 64 is co-linearly positioned in downwardly biased relation on the top surface of bushing 60. The lower portion 66 of a hollow plunger 68 is received within the upper end of spring 64. Plunger 68 includes a flange 70, the lower surface of which is biased against the upper end of spring 64, thereby positioning plunger 68 in biased, axially movable, co-linear relation to spring 64. Hollow plunger 64 includes four holes 72 annularly spaced adjacent the top end of its elongated body 73, the purpose of which will be explained hereinafter.

Plunger 68 is held in biased relation to spring 64 by nut 48, which in turn holds plunger 54 in biased relation to spring 50. Nut 48 includes an externally threaded flange 74 which is threadingly received by internal threads 46 formed in the open top of cavity 36, and a hex head 76 whose flats may be engaged for purposes of sealing or unsealing opening 36. When nut 48 is threadingly engaged with cavity 36, body 73 of plunger 68 concentrically, frictionally, and slidingly extends through the opening 78 formed centrally through nut 48 and out of body 14. Flange 70 engages a shoulder (not shown) inside nut 48 to limit the distance plunger 68 extends through nut 48, and a rubber O-ring 80 is positioned between flange 70 and the nut's shoulder to seal the interface between the two members.

An elongated handle, or lever, 82 is pivotally connected at one end thereof to a spline 84. A rivet 86 passes through handle 82 and spline 84 to interconnect the two, and handle 82 is selectively pivotal about the longitudinal axis of rivet 86 between neutral and compressed positions. Handle 82 includes a cam surface 88 which engages the top end of plunger 68. When in its neutral position, body 73 of plunger 68 extends out of body 14, and cam surface 84 of handle 82 rests atop body 73. By a user pivoting handle 82 downwardly, cam surface 84 forces plunger 68 axially downwardly through nut 48 and into body 14, thereby compressing spring 64 and engaging lower portion 66 with upper head 62 of plunger 54. The effect of plunger 68 compressing spring 64 and engaging head 62 produces a downward biasing force against plunger 54, and hence downward, axial movement of plunger 54 whose flange 56, in turn, compresses spring 50. By compressing spring 50, flange 56 becomes slightly distanced from shoulder 40, thereby effectively opening valve assembly 38, and hence the flow of air through inlet 16 to cavity 36 and outlet 18.

By leaving handle 82 in its neutral position, spring 64 produces equal and opposite biasing forces to flange 70 and bushing 60 which positions body 73 outside of body 14 and plunger 68 in spaced vertical relation to plunger 54. This, in turn, maintains an upward biasing force applied to flange 56 by spring 50 which is counteracted by flange 56 abutting up against gasket 58 and washer 60, thereby effectively closing valve assembly 38 by sealing off the flow of air from inlet 16 to cavity 36. Therefore, valve assembly 38 may be selectively opened by a user squeezing handle 82, thereby causing it to pivot downwardly, and correspondingly forcing plunger 68 into body 14; or valve assembly 38 may be left closed by leaving handle 82 in its neutral position.

When handle 82 is in its neutral position, any residual air which may leak into cavity 36 from inlet 16, or draft into cavity 36 from outlet 18 will pass through hollow plunger 68 and bleed out through holes 72.

In use, as was previously stated, a first line 22 is fully extended between a compressed air tank 24 and inlet 16, and a second line 28 is fully extended between outlet 18 and glad hand 30. After the valve on tank 24 is opened to permit compressed air to flow through line 22 into inlet 16 at a predetermined pressure (whatever the compressed air tank is regulated at, 100 PSI for instance), a conventional pressure regulator 90 operably attached to device 10 at the interface of inlet 16 and body 14 may be used to selectively regulate the pressure at which the compressed air will pass out of inlet 16. A pressure gauge 92 is operably attached to device 10 at the interface of body 14 and outlet 18, thereby permitting a user to monitor the precise pressure at which the compressed air is passing out outlet 18 and through line 28 to glad hand 30. A user may thus make the necessary connections, position themself where the brakes and brake lines are easily observable, and regulate the pressure starting at a low pressure, i.e., 20 PSI, and increasing the pressure in predetermined increments up to a maximum pressure at which the brakes will operate. Accordingly, a user may determine precisely how much pressure is needed to cause the brakes to properly and effectively function. Accordingly, device 10 provides an effective apparatus for effectively and efficiently diagnosing the pressure required to cause a truck's air brakes to properly function.

What is claimed is:

1. A device for testing air brakes in a vehicle having a glad hand which operably interconnects said air brakes to a source of compressed air, said device comprising:
 a) an elongated body having an inlet receiving end and an opposite outlet receiving end, a first longitudinal axis and an elongated cavity bored therein, said cavity extending between a floor and an opening formed through said body, and along a second longitudinal axis which lies essentially perpendicular to said first longitudinal axis, and said cavity further having first and second sections separated at a defined boundary;
 b) an elongated inlet having proximal and distal ends, and a first longitudinal passage extending therethrough along a third longitudinal axis which is essentially parallel to said first longitudinal axis, said proximal end of said inlet attached to said inlet receiving end of said body with said first longitudinal passage being positioned in fluid communication with said first section of said cavity;
 c) an elongated outlet having proximal and distal ends, and a second longitudinal passage extending therethrough along a fourth longitudinal axis which is essentially parallel to and in vertically spaced relation to said third longitudinal axis, said proximal end of said outlet being attached to said outlet receiving end of said body with said second longitudinal passage being positioned in fluid communication with said second section of said cavity;
 d) a valve assembly operable between open and closed positions including:
  i) first spring means extending axially along said second longitudinal axis and having a first end contacting said floor of said cavity, and an opposite second end;
  ii) first plunger means having first and second opposite ends and mounted in co-linear relation to, and for axial movement along said second longitudinal axis with said first end being positioned in biased relation to said second end of said first spring means, and further including sealing means movable into and out of engagement with said defined boundary separating said first and second sections of said cavity;
  iii) second spring means extending axially along said second longitudinal axis and having first and second opposite ends with said first end being positioned in biased relation to said sealing means;
  iv) second plunger means having opposite first and second ends and mounted in co-linear relation to and for axial movement along said second longitudinal axis, said first end of said second plunger means being positioned in biased relation to said second end of said second spring means, and said second end of said second plunger means being movable into and out of said cavity;
  v) lever means attached to said body for pivotal movement between first and second terminal positions, and having a surface contacting said second end of said second plunger means for effecting movement thereof into and out of said cavity in response to said lever means being moved from said first terminal position to said second terminal position, respectively; and
  vi) means for compressively retaining said valve assembly within said cavity.

2. The device according to claim 1 and further comprising first means for fluidly interconnecting said inlet to said source of compressed air.

3. The device according to claim 2 wherein said first fluid interconnection means includes a first flexible line having a first end operably attached to said source of compressed air, and an opposite second end releasably attached to said distal end of said inlet.

4. The device according to claim 1 and further comprising second means for fluidly interconnecting said outlet to said glad hand.

5. The device according to claim 4 wherein said second fluid interconnection means includes a second flexible line having a first end releasably attached to said distal end of said outlet, and an opposite second end operably attached to said glad hand.

6. The device according to claim 1 wherein said sealing means of said first plunger is comprised of:
 a) a flange integral with said first plunger means and positioned at an intermediate position thereon between said first and second ends;
 b) a bushing having a predetermined periphery and slidably, concentrically mounted on said first plunger means between said flange and said second end, said bushing positioned in essentially fixed, abutting relation to said defined boundary; and
 c) a gasket frictionally attached to said bushing, about the periphery thereof.

7. The device according to claim 6 wherein said bushing and said first plunger means are essentially non-contacting.

8. The device according to claim 1 wherein said second plunger means is hollow.

9. The device according to claim 8 wherein said second plunger means includes at least one hole formed therethrough, adjacent its second end, said at least one hole being positioned outside said cavity when said lever means is in its second terminal position, and positioned within said cavity when said lever means is in its first terminal position, whereby any air present in said cavity when said lever means is in its second terminal position will bleed out of said cavity through said at least one hole.

10. The device according to claim 9 wherein said second plunger means includes a plurality of annularly spaced holes formed therethrough, adjacent its second end.

11. The device according to claim 1 and further comprising pressure regulator means operably attached to said device and positioned at about the interface of said inlet and said body.

12. The device according to claim 1 and further comprising pressure gauge means operably attached to said device and positioned at about the interface of said outlet and said body.

13. The device according to claim 1 wherein said means for compressively retaining said valve assembly within said cavity is a nut which threadingly engages said body at the opening formed therethrough.

14. The device according to claim 13 wherein said nut includes a hole extending centrally therethrough, said second plunger partially extending through said hole, and being positioned in slidable, frictional relation thereto.

* * * * *